C. GARDNER.
CULTIVATOR.
APPLICATION FILED AUG. 19, 1907.

935,487. Patented Sept. 28, 1909.

WITNESSES:
A. S. Diven
M. E. Verbeck.

INVENTOR
Charles Gardner
BY
Eugene Diven
ATTORNEY

UNITED STATES PATENT OFFICE.

CHARLES GARDNER, OF HORSEHEADS, NEW YORK.

CULTIVATOR.

935,487.  Specification of Letters Patent.  Patented Sept. 28, 1909.

Application filed August 19, 1907. Serial No. 389,122.

*To all whom it may concern:*

Be it known that I, CHARLES GARDNER, a citizen of the United States, residing at Horseheads, in the county of Chemung and State of New York, have invented certain new and useful Improvements in Cultivators, of which the following is a specification.

This invention relates to improvements in horse drawn cultivators intended for scraping or hoeing between or at each side of rows of growing plants; and the object of my improvements is to provide a simple and light framework to carry the scraping or hoeing blades, and to so attach said blades that they may be readily changed to conform with the work to be done, and set at any desired angle in both horizontal and vertical planes.

A further object is to so construct the frame that the blades may be positioned to operate between rows or straddling a single row of plants.

I attain my objects by constructing and arranging the parts of the cultivator in the manner illustrated in the accompanying drawings, in which—

Figure 1:
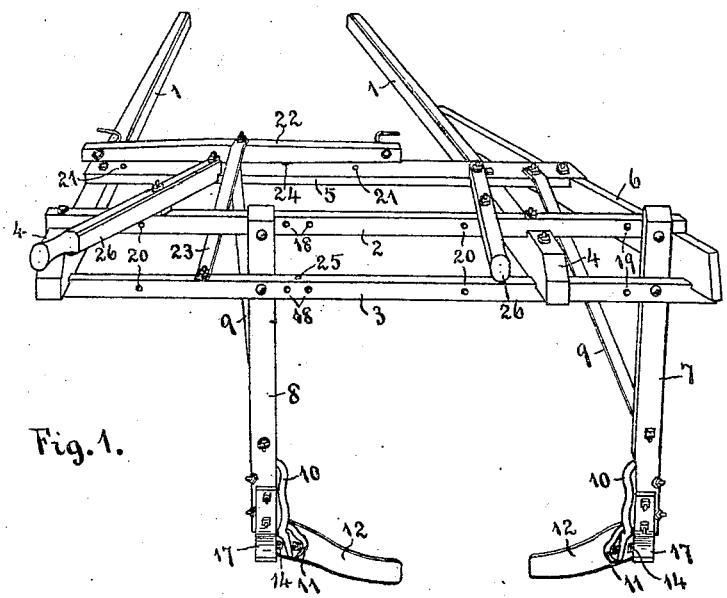
Figure 2:
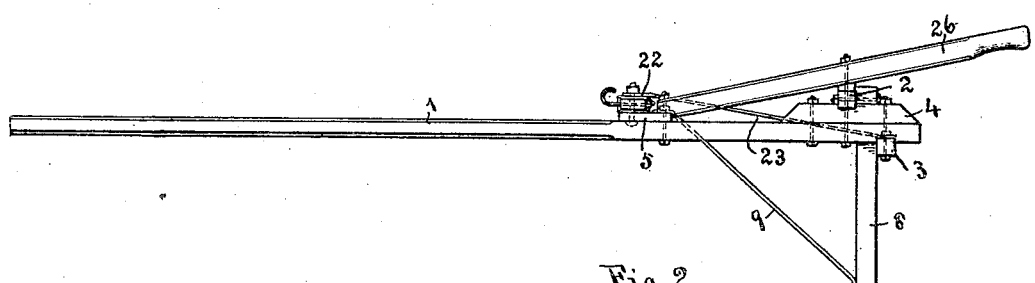
Figure 3:
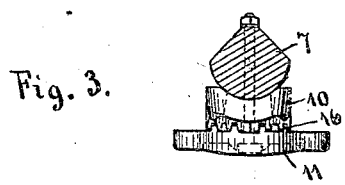
Figure 4:
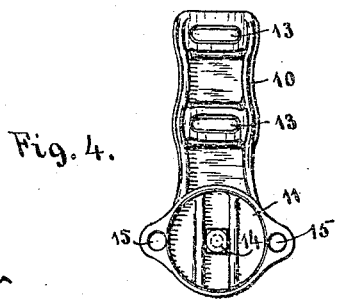

Figure 1 is a perspective view of the cultivator looking at it from the rear; Fig. 2, a side elevation; and Figs. 3 and 4, details showing one of the adjustable foot pieces to which the blades are attached.

Like numerals designate like parts in the several views.

The cultivator, as illustrated in the drawings, is arranged to be drawn by one horse. It will be understood, however, that by a suitable change in the frame it may be arranged for a two horse hitch. The framework as illustrated comprises a pair of forwardly projecting members, shown herein in the form of shafts 1, 1, to the rear ends of which is fastened a transverse member, comprising two cross bars 2 and 3, are fastened the one above and the other below the shafts; said cross bars projecting out a short distance beyond the right hand shaft, and being spaced apart vertically by means of blocks 4, bolted to the upper side of the shafts, as shown more clearly in Fig. 2. Preferably I position the upper cross bar 2 in advance of the lower cross bar 3, so that the upper ends of the standards 7 and 8 may be inserted between them so as to bear on their forward sides against the upper cross bar, and at their rearward sides against the lower cross bar 3, thus firmly bracing the upper ends of said standards against the backward pull on the blades attached to their lower ends. In advance of the cross bars I fasten to the upper side of the shafts the cross piece 5; and, at the right hand side, the projecting ends of the cross bars and cross piece are fastened to a diagonal brace 6 secured at its forward end to the right hand shaft.

The standards 7 and 8 extend vertically downward from the frame and are bolted to holes provided therefor in the cross bars 2 and 3; said cross bars being provided with bolt holes at different points for the purpose of setting the standards in different positions on the framework, as will hereinafter be described. These standards near their lower ends are braced by light iron bars 9, which are carried forward and bolted to the cross piece 5. The lower ends of the standards are rounded at their forward inside corners, and foot pieces 10 are bolted thereto, said foot pieces being of cast iron and fitted to the rounded surfaces of the standards. The bolts, by which the foot pieces are attached to the standards, pass through slotted holes 13 (see Figs. 3 and 4), in order that the foot pieces may be set in different angular positions around the standards. At their lower ends the foot pieces are provided with blocks 11, pivotally mounted thereon, and fastened in place by bolts 14, the abutting surfaces between the blocks and foot pieces being provided with interlocking teeth 16, by which, when the bolts are set up, the blocks will be held in proper pivotal adjustment upon the foot pieces. To these blocks the hoeing and scraping blades 12, which may be of different forms and lengths, are fastened by means of bolts passed through the holes 15. By transposing the blocks on the foot pieces the blades may be readily reversed without detaching them from the blocks. Short curved angle plates 17 are bolted to the standards to support them when drawn over the ground, and to prevent them from cutting into the ground under the action of the blades.

As shown in Fig. 1, the standards are positioned on the cultivator frame for straddling a row of plants, and, if required, the blades may be brought closer to the plants on one side or the other by moving the standard 8 to the right, or the standard 7 to the left, as provided for by the holes marked 18 and 19 on the cross bars 2 and 3. If the blades are to be operated between rows the standards will be moved so as to position them between the shafts, the holes 20 on the cross bars being provided for this purpose. When moved to this position the braces 9 will have their forward ends bolted to the cross piece 5 at the holes marked 21.

The whiffletree 22 is bolted to the cross piece 5, and in order to properly transmit the pull on the whiffletree to the standards when set over to the right, as shown in Fig. 1, the whiffletree will be positioned to the left of the central line between shafts, and a draw bar 23 will extend from the upper end of the bolt to the lower cross bar 3 at a point to the left of the standard 8. The proper positioning of the whiffletree and the draw bar 23 for a given frame will require some experimenting to determine the proper points of transmission of the pull on the whiffletree to cause the right hand standard to be drawn in proper alinement with the left hand standard. When the standards are set to operate between rows the whiffletree will be moved to hole 24 on the cross piece 5, and the draw bar 23 will be bolted to the cross bar 3 at the hole 25; thus transmitting the pull on the whiffletree to a point located centrally between the standards and directly behind the horse.

The cultivator is guided by means of the handles 26, bolted to the top of the cross bar 2, and at their forward ends attached to the cross piece 5.

Instead of placing the cross bars one in advance of the other, with the standards between, I may locate said cross bars one directly above the other, and bolt the standards to either the forward or rearward sides of the two cross bars, thereby permitting a less obstructed view by the operator of the ground and plants in front of the blades. I may also employ a single cross bar for the transverse member instead of two bars. For strength and stiffness, however, I prefer the arrangement of the cross bars as herein illustrated.

Other changes in the details of construction may be adopted without departing from the spirit of my invention.

It will readily be understood that the blades 12 may be set on the foot pieces at different angles to one another in both vertical and horizontal planes, so as to properly position them for different requirements in the work to be done; either for scraping and weeding between rows, or for hilling up the plants, etc.

What I claim as my invention and desire to secure by Letters Patent is—

1. A cultivator comprising a pair of forwardly projecting members, a transverse member fastened to the rearward ends of the forwardly projecting members and projecting out at one side thereof, a brace extending from the projecting end of the transverse member to the forwardly projecting member on that side, a cross piece fastened to the forwardly projecting members in advance of the transverse member, a pair of vertical standards having their upper ends fastened to the transverse member and capable of being set in different positions along said member, braces extending from the standards to the cross piece and adapted to be fastened in different positions on said cross piece to correspond with the adjustment of the standards, and laterally projecting blades attached to the lower ends of the standards.

2. A cultivator comprising a pair of forwardly projecting members which serve as shafts, a transverse member consisting of two cross bars fastened one above and the other below the rearward ends of the shafts and projecting out at one side thereof, a cross piece fastened to the shafts in advance of the cross bars, a pair of vertical standards having their upper ends fastened to the cross bars and capable of being set in different positions along the bars, braces extending from the standards to the cross piece and adapted to be fastened in different positions on said cross piece to correspond with the adjustment of the standards, a whiffletree adjustably mounted on the cross piece between the shafts, and laterally projecting blades attached to the lower ends of the standards.

In testimony whereof I have affixed my signature, in presence of two witnesses.

CHARLES GARDNER.

Witnesses:
 JAMES BACON,
 A. S. DIVEN.